No. 870,799. PATENTED NOV. 12, 1907.
F. W. SCHOENBERGER.
BEARING.
APPLICATION FILED JULY 5, 1907.
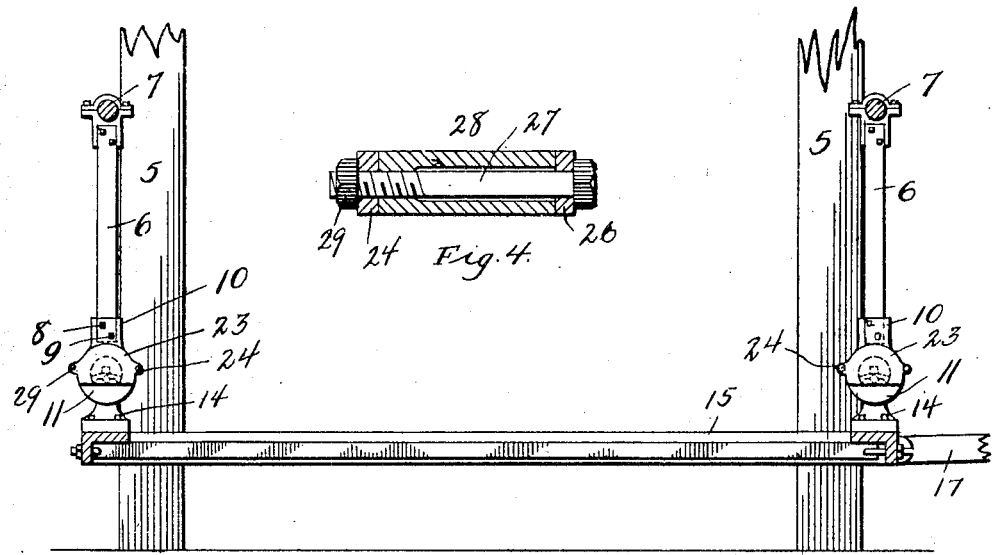
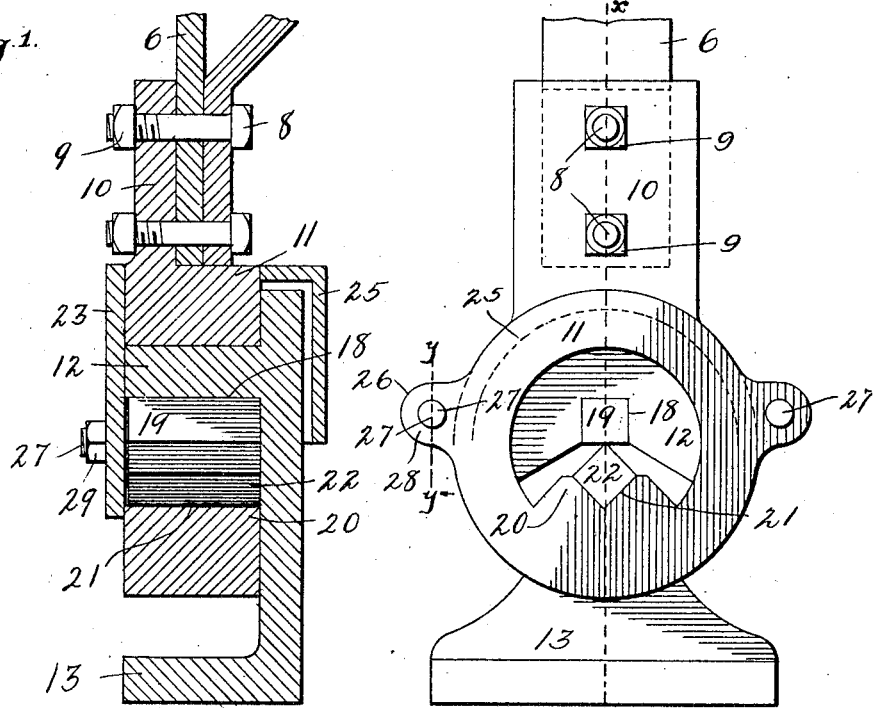
Witnesses
Carl Stoughton
J. G. Campbell
Inventor
Frank W. Schoenberger
By Chester C. Shepherd
Attorney

UNITED STATES PATENT OFFICE.

FRANK W. SCHOENBERGER, OF COLUMBUS, OHIO.

BEARING.

No. 870,799.

Specification of Letters Patent.

Patented Nov. 12, 1907.

Application filed July 5, 1907. Serial No. 382,197.

*To all whom it may concern:*

Be it known that I, FRANK W. SCHOENBERGER, a citizen of the United States, residing at Columbus, in the county of Franklin and State of Ohio, have invented certain new and useful Improvements in Bearings, of which the following is a specification.

My invention relates to bearings and has for its object the provision of a device of this character adapted to form a swinging connection between the parts of gang saws, though it is to be understood that the invention is not limited to this use, but that it may be employed in any other structure where a bearing of this character is desirable.

Further objects and advantages of the invention will be set forth in the detailed description which now follows.

In the accompanying drawing: Figure 1 is a vertical sectional view of a portion of a gang saw illustrating the application of the invention, Fig. 2 is a detail side view upon an enlarged scale of one of the bearings hereinafter described, Fig. 3 is a transverse vertical section through said bearing upon line $x$—$x$ of Fig. 2, and Fig. 4 is a detail sectional view upon line $y$—$y$ of Fig. 2.

Like numerals designate corresponding parts in all of the figures of the drawing.

Referring to the drawing, the numeral 5 designates the supporting framework of a gang saw. Arms 6 are mounted for swinging movement upon transverse rods 7, the lower ends of these arms being secured by bolts 8 and nuts 9 to an extension 10 of a bearing ring 11. This bearing ring encircles the bearing boss 12 of a hanger 13, said hanger being secured by nuts 14 to the frame 15 of the gang saw. Reciprocatory movement is imparted to the gang saw through the connecting rod 17 in the usual and well known manner, the gang saw proper forming no part of the present invention, the invention residing particularly in the bearing shown in Figs. 2 and 3. Heretofore the bearing bosses have been circular in form and have had a bearing in the bearing rings entirely about their periphery. It sometimes takes a week to saw through a large block of marble and it has been found that by the time such a task is completed, the bearings have become so worn and widened that they have to be removed and others substituted therefor. In order to obviate this difficulty the bearing boss 12 is cut out as at 18 for the reception of a hardened steel block 19 and the bearing ring 11 is provided with a boss 20 which has a radial shaped recess 21 formed in the upper face thereof for the reception of the lower half of a diamond shaped steel block 22, the upper edge of this diamond shaped block bearing against the lower face of the block 19. It will therefore be seen that the bearing between the boss 12 and the ring 11 is the bearing provided by the knife edge of the diamond shaped block 22. Plates 23 having perforated ears 24 formed thereon are adapted to be bolted to the outer faces of the bearings, to thereby cover the blocks 19 and 22. Caps 25 having ears 26 formed thereon are adapted to be bolted to the rear faces of the bearings. Bolts 27 which pass through the ears 26 of the caps, through ears 28 of the bearing ring 11 and through the ears 24 of the plates 23, serve to tie all of these parts together, said bolts having nuts 29 threaded thereon.

By virtue of the structure herein shown and described, it is only necessary when one edge of the block 22 becomes worn, to take said block out and give it a quarter turn in order to bring a new and unworn edge into engagement with the block 19. The same thing is true of the block 19. When the surface thereof becomes worn, it may be given a quarter turn to bring a new surface into engagement with the block 22. After all of the edges of the block 22 have become worn, it may be used in place of the block 19 and the block 19 may be placed in the socket 21 and as a substitute for the block 22. The operation will then be repeated, the block 19 being given a quarter turn each time its edges become worn, as was formerly done with the block 22, the blocks 19 and 22 corresponding in size and each being adapted to fit into the socket provided for the other.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a device of the character described, the combination with a pair of bearing members having sockets formed therein, of a pair of hardened blocks adapted to engage with each other, and either of said blocks being adapted to fit into either of said sockets.

2. In a device of the character described, the combination with a pair of bearing members having sockets formed therein, of a pair of hardened angular blocks adapted to engage with each other, and either of said angular blocks being adapted to fit into either of said sockets.

3. A bearing comprising a pair of bearing members, each of said bearing members having a socket formed therein, an angular block seated in one of said sockets, and a second angular block seated in the other of said sockets, one of said angular blocks presenting one of its edges to one of the sides of the other of said angular blocks.

4. A bearing comprising a pair of bearing members, each of said bearing members having a socket formed therein, an angular block seated in one of said sockets, and a second angular block seated in the other of said sockets, one of said angular blocks presenting one of its edges to one of the sides of the other of said angular blocks, and said blocks being adapted to be substituted for each other.

5. In a device of the character described, the combination with a bearing ring, of a bearing boss, both said bearing ring and said bearing boss having sockets formed therein, angular blocks seated in said sockets, one of said bearing blocks presenting its edge to one of the sides of the other of said bearing blocks.

6. In a device of the character described, the combination with a bearing ring, of a bearing boss, both said bearing ring and said bearing boss having sockets formed therein, angular blocks seated in said sockets, one of said bearing blocks presenting its edge to one of the sides of the other of said bearing blocks, said blocks being adapted to be substituted for each other.

In testimony whereof I affix my signature in presence of two witnesses.

FRANK W. SCHOENBERGER.

Witnesses:
  A. L. PHELPS,
  L. CARL STOUGHTON.